(12) United States Patent
Whitney et al.

(10) Patent No.: US 7,818,377 B2
(45) Date of Patent: Oct. 19, 2010

(54) EXTENDED MESSAGE RULE ARCHITECTURE

(75) Inventors: David Charles Whitney, Sammamish, WA (US); Nicolae Surpatanu, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1670 days.

(21) Appl. No.: 10/852,018

(22) Filed: May 24, 2004

(65) Prior Publication Data

US 2006/0031311 A1  Feb. 9, 2006

(51) Int. Cl.
   G06F 15/16 (2006.01)
(52) U.S. Cl. .................. 709/206; 709/231; 709/236; 709/246
(58) Field of Classification Search ............ 709/206, 709/236
   See application file for complete search history.

(56) References Cited

U.S. PATENT DOCUMENTS

| | | | | |
|---|---|---|---|---|
| 5,917,489 | A | 6/1999 | Thurlow et al. | 345/809 |
| 5,978,566 | A | 11/1999 | Plank et al. | 709/206 |
| 6,057,841 | A * | 5/2000 | Thurlow et al. | 715/809 |
| 6,161,130 | A | 12/2000 | Horvitz et al. | 709/206 |
| 6,505,167 | B1 | 1/2003 | Horvitz et al. | 705/9 |
| 6,553,358 | B1 | 4/2003 | Horvitz | 706/45 |
| 2002/0199095 | A1 | 12/2002 | Bandini | |
| 2004/0133599 | A1* | 7/2004 | Warren et al. | 707/104.1 |
| 2004/0139165 | A1 | 7/2004 | McMillan | |
| 2006/0114826 | A1* | 6/2006 | Brommer | 370/230 |

OTHER PUBLICATIONS

Redmond, T. Microsoft Exchange Server 2003. Digital Press [online], 2003 [retrieved on May 22, 2009]. Retrieved from the Internet: <URL: http://books.google.com/books?id=XIMgyYrTxZ0C&pg=PA240&dq=Microsoft+exchange+server+2003+rule+size> Section 4.5.3, p. 240.*
Microsoft Help and Support. OL2000: (CW) Error Message: Not Enough Space on the Exchange Server to Store All of Your Rules. Article ID 236088 [online], Oct. 2003 [retrieved on May 22, 2009]. Retrieved from the Internet <URL:http://support.microsoft.com/kb/236088>.*

(Continued)

Primary Examiner—William C Vaughn, Jr.
Assistant Examiner—Adam Cooney
(74) Attorney, Agent, or Firm—Merchant & Gould P.C.

(57) ABSTRACT

Embodiments provide for extending the architecture of a legacy messaging system that otherwise communicates message rules to a client as rows in a rule table. Due to architectural limitations of some messaging systems, rules larger than a specified size are prevented from being streamed between a server and a client. Example embodiments provides for extended rules that represent a combination of conditions, actions or exceptions to be performed on messages and are created by a client as message objects. Because they are created by a client as message objects, rather than rows on a table, the extended rules are allowed to be streamed between the client and server, thus extending the architecture of a legacy messaging system. The client also sets a property value on the message object created, thereby allowing the server to identify the message object as including the extended rule. The system, however, still supports legacy clients.

36 Claims, 7 Drawing Sheets

OTHER PUBLICATIONS

Bass, T., et al., "A Simple Framework for Filtering Queued SMTP Mail (Cyberware Countermeasures)," MILCOM 97 Proceedings, Nov. 1997, vol. 3, pp. 1140-1144.

Harker, R., Selectively Rejecting SPAM Using Sendmail 1997 LISA Xi, Oct. 26-31, 1997, San Diego, CA, pp. 205-220.

Petri, Daniel; How can I configure Outlook 2003 to block spam; Copyright 2003; 8 pages.

US Office Action dated Aug. 5, 2009 in U.S. Appl. No. 10/892,996.

US Office Action dated Aug. 19, 2009 in U.S. Appl. No. 10/892,711.

US Office Action dated Mar. 19, 2010 in U.S. Appl. No. 10/892,996.

US Office Action dated Mar. 30, 2010 in U.S. Appl. No. 10/892,711.

* cited by examiner

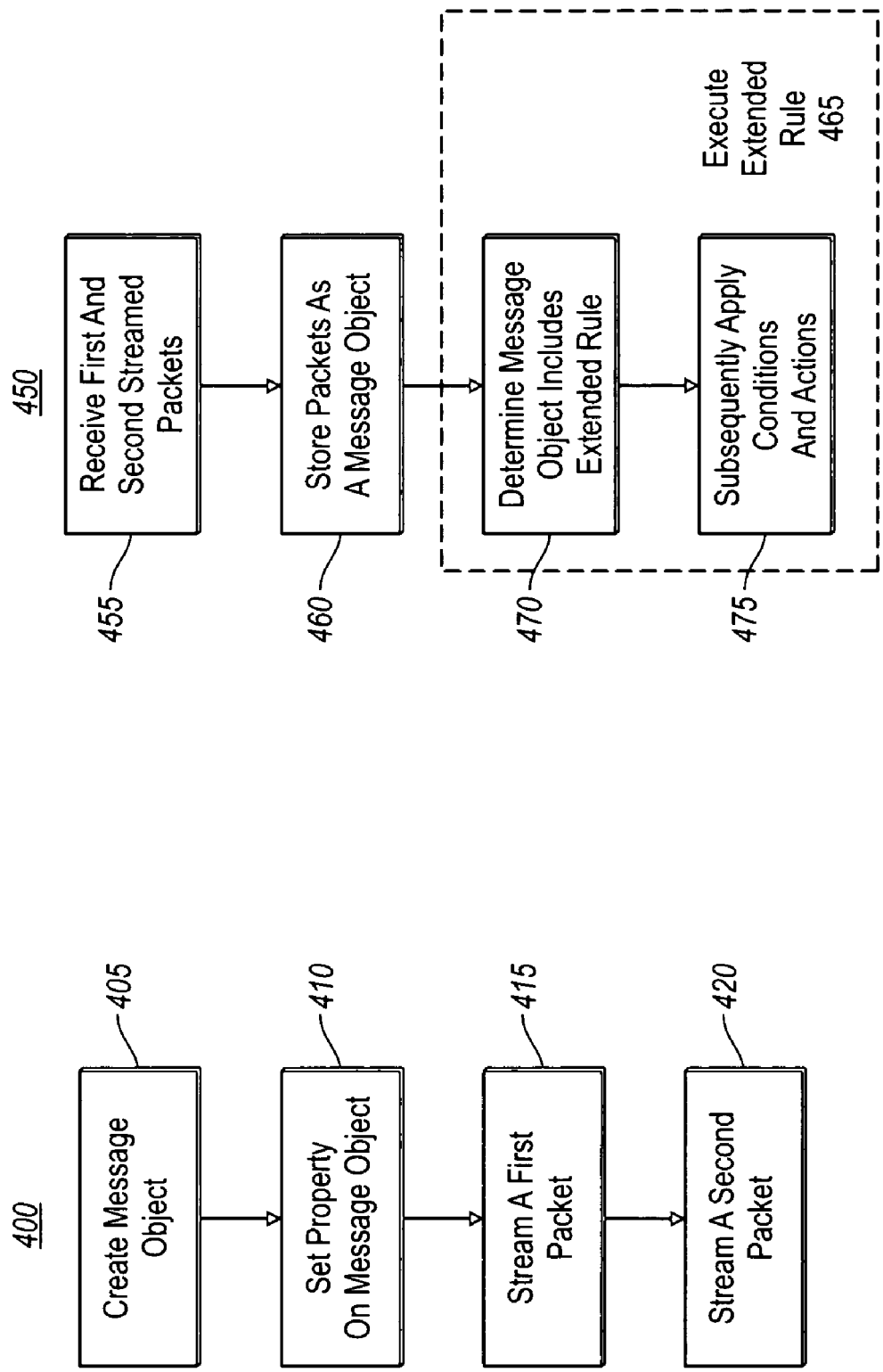

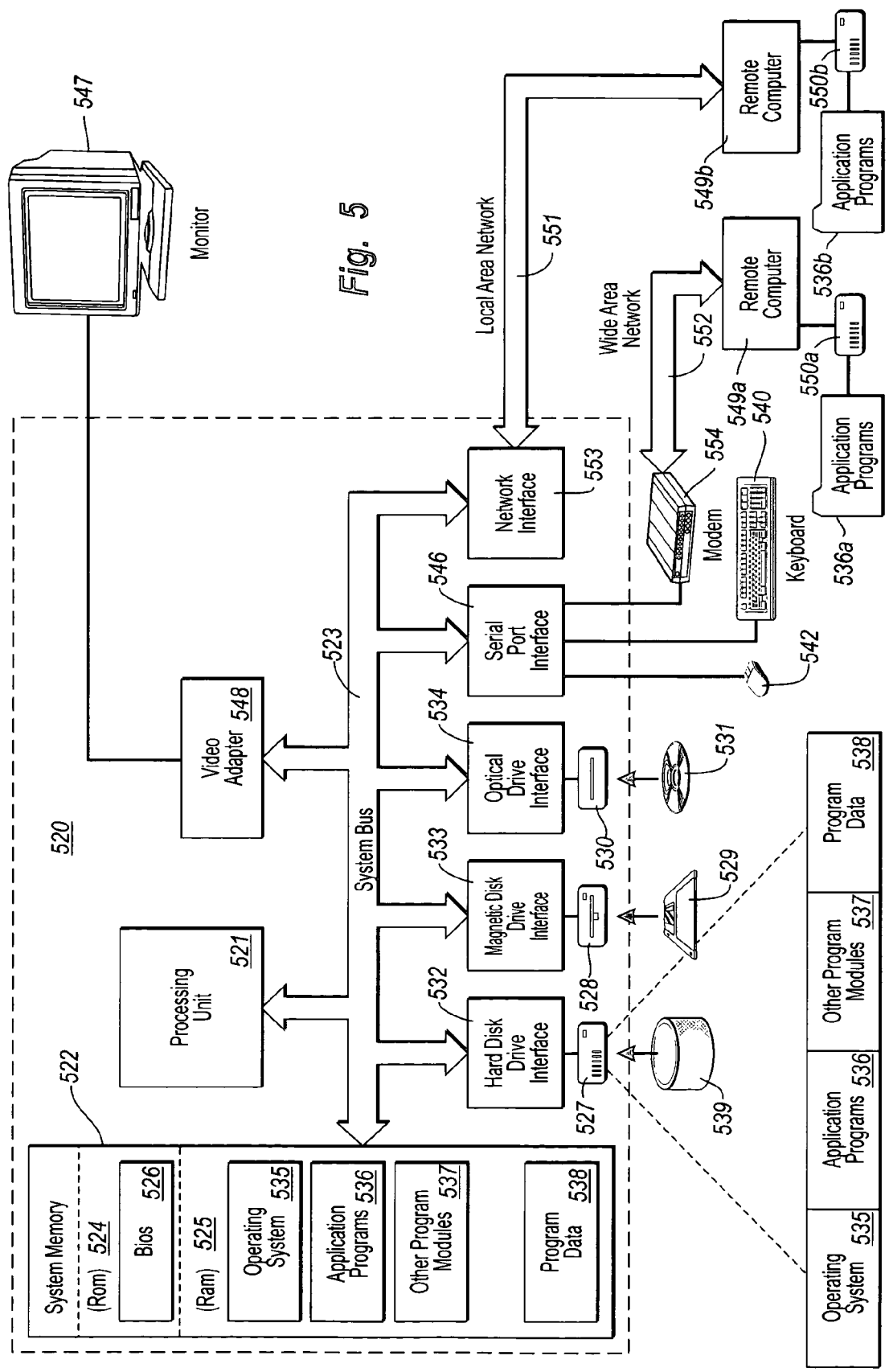

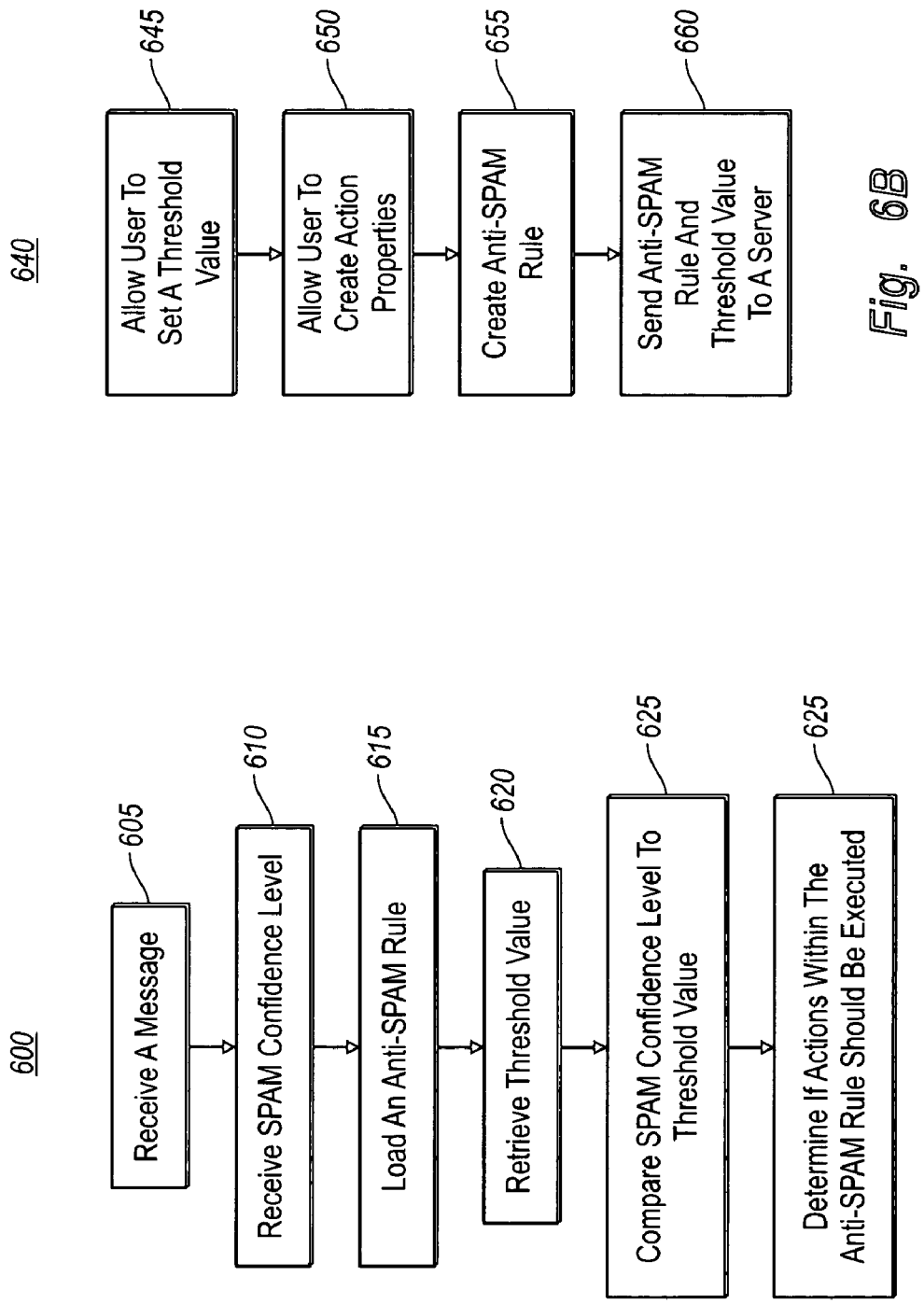

EXTENDED MESSAGE RULE ARCHITECTURE

CROSS-REFERENCE TO RELATED APPLICATIONS

N/A

BACKGROUND OF THE INVENTION

1. The Field of the Invention

The present invention generally relates to messaging systems. More particularly, the present invention provides for extending message rule architectures such that rules that include data larger in size than present architectures support can be transferred between a server and a client for modification and implementation.

2. Background and Related Art

Electronic messaging systems (e.g., e-mail, messaging boards, etc.) have become an increasingly popular way to communicate. Business users increasingly rely on electronic messages to share ideas, transmit documents, schedule meetings, and perform a multitude of other every day tasks.

These tasks may be accomplished by a variety of software programs. For example, e-mail programs facilitate the transmission of messages between users. Messaging-enabled scheduling programs allow users to request and schedule meetings and appointments via electronic messages. Computer programs known as desktop information managers attempt to coordinate the growing stream of electronic communications by incorporating e-mail, a calendar, task management, contact management, notes and journal features into a single application program.

The increased reliance on electronic messaging has resulted in a great increase in the number of electronic messages a user sends and receives daily. For example, similar to postal mail advertising and telephone solicitations, electronic message recipients are increasingly being subject to unsolicited mass mailings, commonly referred to as "SPAM." Due in part to the extreme ease and insignificant cost for not only sending electronic messages across extremely large numbers of addresses, but also because of the ease and low cost for obtaining or exchanging e-distribution lists, a user can expect to receive considerably large amounts of SPAM over a short period of time. Accordingly, users desire effective ways to process their messages without spending a lot of time sorting through their inbox, deleting, filing, forwarding, and responding to their messages. For instance, users would like the ability to delete or otherwise store in a separate folder unsolicited electronic messages such as SPAM.

Typical systems provide mechanisms for processing messages in accordance with rules or commands that automatically execute specific tasks or actions when user-provided criteria or conditions are met. For example, a user may want to file all messages from a certain user or regarding certain subject matter in a specific folder. As such, a user can create a list of known e-mail or IP addresses, and/or a list of specific terms that each incoming message should be scanned for, and such conditions identified. The rule then specifies a particular action to take once the conditions are met, e.g., delete, store in a particular folder, forward to other users, etc.

Certain messaging systems store and execute these rules at the server where the incoming messages are initially received. In order to modify the rules, a client must make a request to the server to receive the rules for modification. After receiving and modifying the rule, the client then sends the rules back to the server where they are stored and executed in a format specific to the server.

Although these rule-based messaging systems are reasonably effective and user-friendly, these systems also have various shortcomings. For example, some services impose aggregate size limitations on rules. Accordingly, an obvious solution to such problem would be to lift the aggregate size limitation; however, even if this limitation were removed, other architectural constraints limit the size of the rules. For instance, some systems provide that when a user desires to make changes to the rules, a server communicates the rules to a client through a table interface as rows within a rules table. Due to existing architectural constraints, however, many systems don't allow for rows on a table to be streamed. Accordingly, the individual size of rules (as well as the aggregate size) is limited to the size of the data buffer for sending a packet of data from the server (e.g., a Remote Procedure Call ("RPC") buffer). Such restrictions become particularly problematic when large rules with extensive listings of addresses or other information are desired, e.g., white lists or black lists.

Clearly one solution to overcoming the deficiencies of current messaging systems would be to redefine the architecture itself. There are, however, several shortcomings associated with such a solution. For example, such modification may require most if not all users to update their client software. Accordingly, users with legacy clients that implement the legacy rules would not be supported with the change in the rule architecture. Further, those that wanted to continue using the rules would be forced to purchase updates or switch services, thus pushing additional costs on the user. Moreover, there are instances where the server/client software implementation of the system cannot be modified in an elegant way because design choices preclude simple solutions to new problems.

Another drawback of current messaging systems is that rules and other data are stored on the server in a form specific to the server. For example, the global identifiers within at least the action structures for rules are translated by a service provider into server specific form, which are stored on the server as such. Accordingly, when a client request rule modifications, the identifiers on the server (e.g., an identifier for the destination folder in the event of a move action) must be translated from the server's specific form back to the global form. Because the rules are stored on the server with the identifiers within the action structures in the server specific form, rules cannot simply be transferred from one server to another. As such, if a client switches services, or even changes servers within the same service, identifiers must be translated back to the global form and then sent to the new server, which then translates the global identifiers into its server specific form. This creates a tremendous amount of overhead and inefficient use of system resources.

Still another drawback of typical messaging systems is that there is little or no flexibility in controlling Anti-SPAM rules. For example, typical messaging systems set the conditions and actions for an Anti-SPAM rule such that if a message is rated above a predetermined threshold as SPAM, then the message is simply sent to a junk folder or deleted. There is no ability to decouple the SPAM confidence level (i.e., the confidence level that a message includes unsolicited or unwanted content) from the actions, e.g., to move the SPAM to a junk folder or delete it. Further, there is no flexibility in the actions carried out in the event the SPAM confidence level is above the predetermined threshold, i.e., there is just send to junk folder or delete it.

BRIEF SUMMARY OF THE INVENTION

In accordance with example embodiments of the present invention, the above-identified deficiencies and drawbacks of current messaging systems are overcome. For example, in a messaging system that includes a server that otherwise communicates message rules to a client through a table interface to exchange message rules as rows in a rule table, embodiments provide for extending a rule architecture to allow a client to stream and store message rule data to a server. The embodiments extend the rule architecture because architectural limitations of the message system prevent rules larger than a specified size from being transferred.

Example embodiments provide for creating a message object that includes an extended rule. The extended rule sufficiently large in size such that the extended rule cannot be transferred as a single data packet. Further, a set property on the message object is used to identify the message object as including a message rule. Because the extended rule is included within the message object, first and second packets including different portions of the message object can be streamed to the server for storage and subsequent execution of the extended rule.

Other example embodiments provide for extending the rule architecture by implementing rules that were streamed to a server by a client. First and second streamed packets are received from the client. The packets are then stored as a message object at the server. The message object includes an extended rule sufficiently large in size that it cannot be transferred in a single data packet. Based on a property on the message object set by the client, it is determined that the message object includes the extended rule. Accordingly, conditions and actions within the extended rule are subsequently applied to a message received at the server.

Still other example embodiments provide for decoupling message rule actions from a SPAM confidence level by assigning a SPAM confidence level to a message at a first module, and carrying out a user specified Anti-SPAM rule at a second module. A message is received at a calculation module; and based on the contents of the message, the calculation module generates a SPAM confidence level, which indicates the likelihood that the received message includes unsolicited or unwanted data. Further, an Anti-SPAM rule that includes conditions and actions defined by a user is accessed at a rule execution module, which is used to scan the message to determine if the conditions are met in determining if any actions should be executed.

Still yet other example embodiments provide for decoupling a module that executes a user a defined Anti-SPAM rule from a module that assigns a SPAM confidence level by assigning a SPAM confidence level to a message at a front end server, and carrying out the user specified Anti-SPAM rule at a back end server. A message and a SPAM confidence level is received from a front end server. The SPAM confidence level indicating the likelihood that the received message includes unsolicited or unwanted data. Further, an Anti-SPAM rule that includes actions defined by a user is loaded, the actions specifying how to process the message when the SPAM confidence level exceeds a threshold value. The threshold value is also retrieved for determining when a user defined SPAM rating rule should be loaded into memory for execution. Based on a comparison of the SPAM confidence level to the threshold value, it is then determined if the actions within the user defined Anti-SPAM rule should be executed on the message.

Further example embodiments provide for decoupling a module that assigns the SPAM confidence level from a module that executes actions to be performed on a message by allowing a user to define action properties. A user interface is provided that allows a user to set a threshold value to be compared against a SPAM confidence level to determine when action properties of an Anti-SPAM rule should be implemented. The SPAM confidence level generated in response to receiving a message and defining how to rate the message as including unsolicited or unwanted data. Further, through the user interface, a user is allowed to create action properties associated with the Anti-SPAM rule. The action properties define how to process a message when the SPAM confidence level exceeds the threshold value. Moreover, the Anti-SPAM rule is created and configured to implement the action properties defined by the user when the SPAM confidence level exceeds the threshold value. The SPAM rating rule and the threshold value are then sent to a server for storage and subsequent implementation.

Still yet other example embodiments provide for translating a message rule from a global form into a server specific form during execution of the message rule in a messaging system that other wise stores message rules in a server specific form. A message is received, and in response thereto, a serialized extended rule that was serialized by a client using a code library is retrieved from server storage. Further, a copy of the code library is utilized to deserialize the extended rule. The extended rule including condition and action structures, at least the action structures including identification values in a global form that can be compatibly transferred between computer systems that have differing server specific forms. Moreover, the identification values are translated into server specific form for use in applying the action structures to a message.

Other example embodiments provide for storing a message rule in a global form understandable by both a server and a client for ease in transferring the message rule between servers. An extended rule is created that includes condition and action structures, at least the action structures including identification values in a global form in that they can be compatibly transferred between computer systems that have differing server specific forms. Further, a code library is utilized to serialize the extended data for transportation to a server, wherein during execution of the extended rule the server translates the identification values into a server specific form. The serialized extended rule data is then sent to the server for storage in the serialized form, the server utilizing a copy of the code library to deserialize the extended rule during execution.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates an example flow chart of a method of extending a rule architecture to allow a client to stream and store message rule data to a server in accordance with exemplary embodiments;

FIG. 4B illustrates an example flow chart of a method of extending a rule architecture by implementing rules that were streamed to a server in accordance with exemplary embodiments;

FIG. 5 illustrates an example system that provides a suitable operating environment for the present invention.

FIG. 6A illustrates an example flow chart of a method of decoupling a module that executes message rule actions from a module that assigns SPAM confidence level in accordance with exemplary embodiments;

FIG. 6B illustrates an example flow chart of a method of decoupling a module that assigns SPAM confidence level from a module that executes actions to be performed on a message in accordance with exemplary embodiments;

DETAILED DESCRIPTION OF THE PREFERRED EMBODIMENTS

The present invention extends to methods, systems and computer program products for extending a messaging systems architecture to implement extended rules, for example, that have data sizes larger than can be transferred in a single data packet. Further, the present invention provides for storing extended rules in a global form for ease in transferring the extended rules between servers. Moreover, the present invention provides for decoupling of a SPAM confidence level from the actions to be performed in response thereto and to provide the flexibility in choosing actions to apply. The embodiments of the present invention may comprise a special purpose or general-purpose computer including various computer hardware, as discussed in greater detail below.

Reference will now be made to the figures wherein like structures will be provided with like or similar reference designations. It is understood that the drawings are example schematic representations of embodiments of the invention; and therefore are not meant to limit or otherwise narrow the scope of the present invention.

Figure 1:
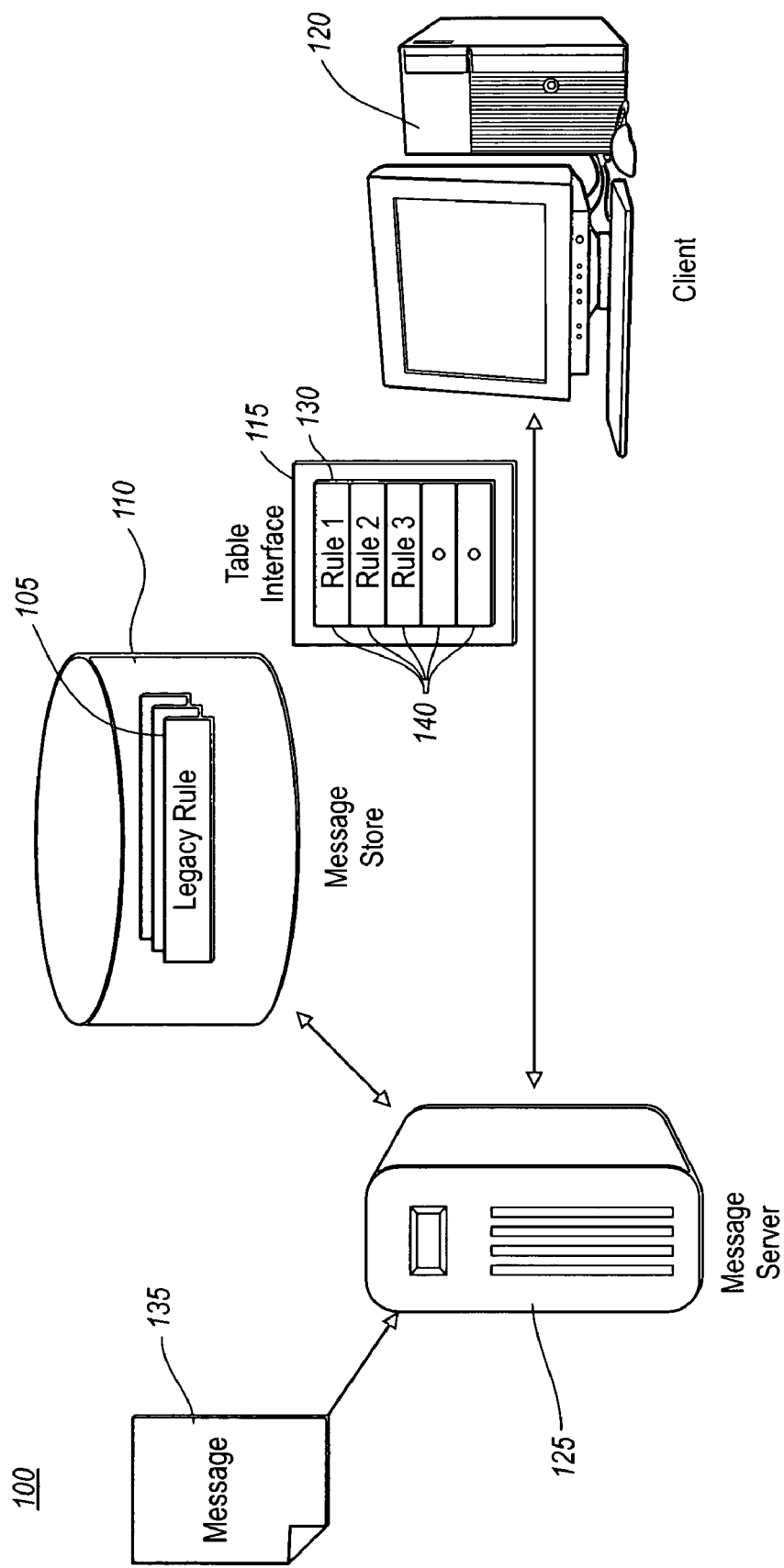
FIG. 1 illustrates a typical messaging system where rules are communicated to a client as rows in a rule table through a table interface.

FIG. 1 illustrates a typical messaging system 100 that receives messages and is capable of applying rules to the incoming messages. Typical messaging systems, like messaging system 100, store rules in a server specific form. In order to modify the rules, client 120 makes a call or a request for rule info. Rules, e.g., legacy rule 105, are stored as message objects with properties set on the object that identify it as a rule. Accordingly, when message server 125 receives a call or request for rule info, message server 125 retrieves the rules, e.g., legacy rule 105, from the message store 110 and parses it into an array of individual rule structures, each of which has a small number of properties, such as the condition and actions to carry out on a message, rule identity, version, display name, state flags, and other properties of the rule. The server 125 constructs a table object for the client 120 and sends the client 120 a reference to the table. The rules are then communicated to the client through the table interface 115 as rows 140 within the rule table 130.

As previously mentioned, the legacy rules 105 are stored in a proprietary form specific to the message server 125. The specific form is due in part to the fact that condition and action structures for the legacy rules 105 contain identifiers or identification values (e.g., an identifier for the destination folder in the event of a move action). These identifiers are global in nature; however, they are transformed and stored in store 110 in a proprietary form specific to the server 125. Accordingly, when client 120 requests one or more rows from the table 130, server specific form of legacy rule 105 is sent to client's 120 service provider (not shown), which translates the identifiers from the proprietary or server form into the global form understood by the client 120.

As a user makes changes to the rules, the client 120 can make the appropriate changes in its own memory context and subsequently issues "modify row" commands to the server 125 via the client-side service provider. Accordingly, the client-side service provider will translate the global identifiers or client-form rows of rules into the proprietary or server 125 form for transmission to the server 125. The serialized data may then be stored again as message objects 105 in message store 110.

As previously mentioned, however, there are several drawbacks to such messaging systems 100. First, some services impose aggregate size limitations on rules. For example, some systems impose an aggregate size limitation on legacy rules 105 of 32 kilobytes. As such, the creation of a large number of rules, or rules that are large in data size, is not possible in such messaging systems. Accordingly, an obvious solution to such problem would be to lift the aggregate size limitation; however, even if this limitation where removed, other architectural constraints limit the size of the rules. For instance, because server 125 communicates the legacy rules 105 to a client 120 through a table interface 115 as rows 140 within a rules table 130, existing architectural constraints do not allow for rows 140 to be streamed. Accordingly, the individual size of legacy rules 105 (as well as the aggregate size) is limited to the size of the data buffer (e.g., RPC buffer) for sending a packet of data between client 120 and server 125. Such restrictions become particularly problematic when large data size rules are desired, e.g., whitelists or blacklists.

Another drawback of typical messaging systems 100 is that because rules 105 are stored on server 125 in server specific form, rules 105 cannot easily be transferred between servers, even within the same service. As such, if a client 120 switches services, or even if it is desired to simply change servers within the same service, identifiers are required to be translated back to the global form and then sent to the new server, which then translates the global identifiers into its server specific form. This creates a tremendous amount of overhead and inefficient use of system resources.

Figure 2:
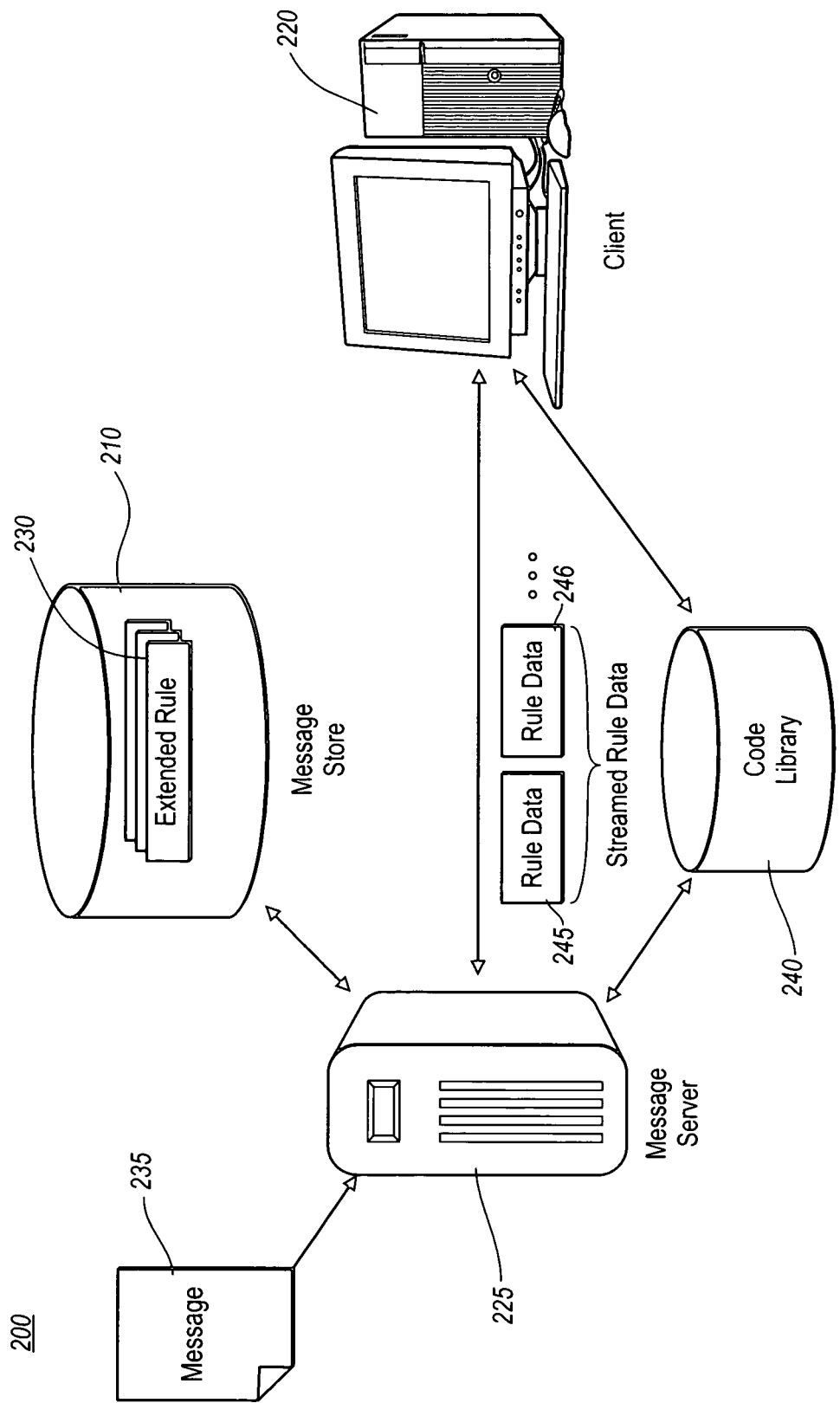
FIG. 2 illustrates a messaging system that utilizes a code library to serialize and deserialize rule data that can be streamed and stored in a global form as message objects in accordance with example embodiments.

The above-identified deficiencies and drawbacks of typical message services 100 are overcome through exemplary embodiments of the present invention. For instance, embodiments provide for a messaging system that can support extended rule data that is sufficiently larger in size such that it cannot be transferred in a single data packet. As shown in FIG. 2, a messaging system 200 is provided that has a server 225, client 220, code library 240 and messaging store 210. Example embodiments provide that if a user of client 220 desires to create rules that are sufficiently large, or if the aggregate size limitation of the legacy rules 105 is met, then the client can create extended rules 230 and store them in message store 210. In particular, client 220 may be given instructions on how to programmatically construct an extended rule 230, e.g., create a message object, set the properties on it and save the object on the server's 225's message store 210. The properties set may include a class property that identifies the message object as the extended rule 230.

The extended rule 230 is then serialized using code library 240 and sent to server 225. In particular, the code library 240 is used to flatten the condition and action structures or trees into a binary string of data capable of being streamed between the server 230 and client 220. The code library 240 may consist of, e.g., two calls each for serializing and deserializing the rules' condition and action structures. For example, code library 240 may include an Application Program Interface (API) to serialize a restriction or condition structure into a stream of bytes, and another API to deserialize a stream of bytes into a condition structure. Further, code library 240 may also have an API to serialize rule action structures into a stream of bytes, and another API to deserialize a stream of bytes back into rule action structures.

It should be noted that although code library 240 is shown as a single object in the distributed system 200, one would recognize that code library 240 can be represented as multiple copies on multiple machines. For example, a copy of code library 240 could be stored on client 220, which can then be used to do an in-memory conversion of the serialized data into the structured form usable by the client 220. Similarly, for purposes described below, a copy of code library 240 may be stored on server 225 for deserializing the extended rule during execution. Of course, a single copy of code library 240 could also be used among multiple machines within a distributed system.

Because the client 220 is able to create rules as message objects, a remote procedure call allows such data to be streamed. Accordingly, if a rule is sufficiently large such that it cannot be transferred in a single data packet, or if the legacy architectural limitations are met, the extended rule architecture can be used to create extended rule data 245, 246 that may be streamed. For instance, a first packet of rule data 245 and a second packet of rule data 246 may be streamed from client 220 to server 225. The first packet includes a portion of the message object and the second packet includes a different portion of the message object. The two packets 245, 246 will be linked up and stored in message store 210 as a message object that includes extended rule 230.

Of course, as one would recognize, the streaming technique described above is not limited to just two packets of data. There may be many subsequent packets of data to follow the streamed two packets 245, 246. Conversely, there may only be a single packet of data streamed. In other words, the extended rule architecture can also be used to store and execute message rules that could be normally stored using the legacy architecture. If, however, the legacy limitations are met, e.g., the aggregate size limitation, then the extended rule architecture can be used in further extending the legacy rules. Accordingly, the use of term streaming should be broadly construed to include one or more packets of data and is not meant to limit or otherwise narrow the scope of the present invention, except where explicitly claimed.

The extended rule 230 is stored in a global form understandable by the client. Further, the string data within the message object may be in the form of Unicode. Storing the extended rule 230 in a global form and in Unicode at a data base, such as message store 210, has several advantages. For example, because the extended rules 230 are stored in a global form, if the extended rules are copied from server 225 to a different server (not shown), client 220 will still be able to identify and obtain the rules 215 from the different server and understand the form of the streamed rule data 245, 246. Further, if the server that the extended rules 230 are transferred to has access to a copy of the code library 240, then that server will be able to deserialize the extended rules 230 and translate them into its server specific form during execution. In addition, storing the string data in Unicode advantageously avoids any language conversion of the extended rules 230 by the server 225.

When a message 235 is received at server 225, server 225 identifies the message object 230 as an extended rule 230 based on the class object property set by client 220. The server then calls to APIs within code library 240 to deserialize the extended rule 230. The identifiers (typically the action identifiers) or identification values are then translated from the global form into a server specific form upon loading the extended rule 230 into memory for evaluation and execution. Message 235 is then scanned to determine if the conditions of the extended rule 230 are met, whereupon if the conditions are met, actions that have been defined by the user may be taken on the message 235. The actions may include, but are not limited to, moving or copy the message to a desired folder, forwarding the message to others (e.g., system administrator, etc.), delete the message, reply to the message, modify the message, or any other number of well known actions or combinations thereof.

The legacy rules 105 can also be correlated with the extended rules 230 loaded into memory and executed along with the extended rules 230. This is due to the fact that once the extended rules 230 have been translated from global form into server specific form, the extended rule and the legacy rule forms become essentially the same form. That is, once server 225 loads the rules into memory for evaluation and execution, the methods used to evaluate a match, and carry out actions, and handle error conditions are essentially the same for both the legacy rules 105 and the extended rules 230. In fact, once all the data for these rules 105, 230 is loaded into memory the server then sorts the aggregate list based on each rule's 105, 230 execution sequence number, thereby intermingling the two.

Other example embodiments also provide for modifying extended rules 230. For instance, when the client 220 request to modify rules, the server not only sends the legacy rules as rows 140 in a table 130, but the client 220 (or potentially the server) identifies the extended rule 230 based on the properties set on the message object, wherein the serialized extended rule data 245, 246 is streamed to the client 220. The legacy rules 105 can be modified and processed in accordance with the legacy protocol, but the client 220 need not necessarily know about or have the capability to use the extended rule properties. As such, legacy clients 120 are still supported, but the legacy rule architecture is extended to support rules 230 that are sufficiently large in size than can be transferred in a single data packet. Of course, as mentioned above, the extended rule architecture can also be utilized to create and store rules that could typically be transferred using the legacy protocol.

In any event, the extended rules 230 are modified and processed somewhat differently from the legacy rules 105. For example, client 220 utilizes various APIs in the code library 240 to deserialize the extended rule data. Because the extended rule 230 is stored in a global form understandable by the client 220, no translation of the extended rule 230 is needed. Accordingly, a user can make the appropriate changes to the extended rules 230, and when finished, client 220 can call the prescribed APIs within code library 240 to serialize them into a large array of bytes of rule data 245, 246 and stream them onto the server. Of course, if the serialized data does not exceed the legacy limitations (e.g., aggregate size not larger than 32 kilobytes), then client 220 need not use streams to send the data to the server.

Other example embodiments provide that prior to scanning a message to determine whether or not conditions within either the extended rules 230 or legacy rules 105 are met, a determination is made as to whether or not the actions defined within the rules 230, 105 can be executed at the server. For example, a determination may be made as to whether the destination folder potentially exists in the user's mailbox. This potential existence may be needed to determine if the user created a action that moves or copies the incoming message 235 to a destination in some other storage, e.g., a local PST file, or another mail account. When it is determined that one or more of the actions defined by the rules cannot be executed at the server 225, the rules should be sent to the client 220 for evaluation and execution.

The above example embodiment creating extended rules 230 by a client 220 that can be serialized and stored as message objects allows for rule sizes to essentially be unlimited, bound potentially by quota limits (if any) set on the user's mailbox. Furthermore, the number of rules a client 220 may create is also potentially unlimited. Other example embodiments, however, provide for rule loading and saving codes, which can both limit the size of the conditions of an extended rule 230 that can be loaded in order to preserve performance and storage. The saving code may enforce this limitation by returning an error to the client, whereas the loading code may enforces this by disabling rules over the size limit and marking them in error. Example embodiments provide that a default override may be set at, e.g., 510 kilobytes. Conditions that are larger in size than this may be marked in error state and will not be loaded again until the user corrects the situation.

Further, example embodiments provide for rule loading code, which limits how many extended rules will be loaded. The default for this limitation may be one. In such instance, the rule loading code may selective choose the Anti-SPAM rule as described hereinafter, or may be set to choose some other extended rule 230. If there are more extended rules 230 they will be ignored. As with other features, this load limitation can be overridden with an administrative setting. In addition, this limitation of the number of extended rules feature exists to conserve system resources.

Figure 3:
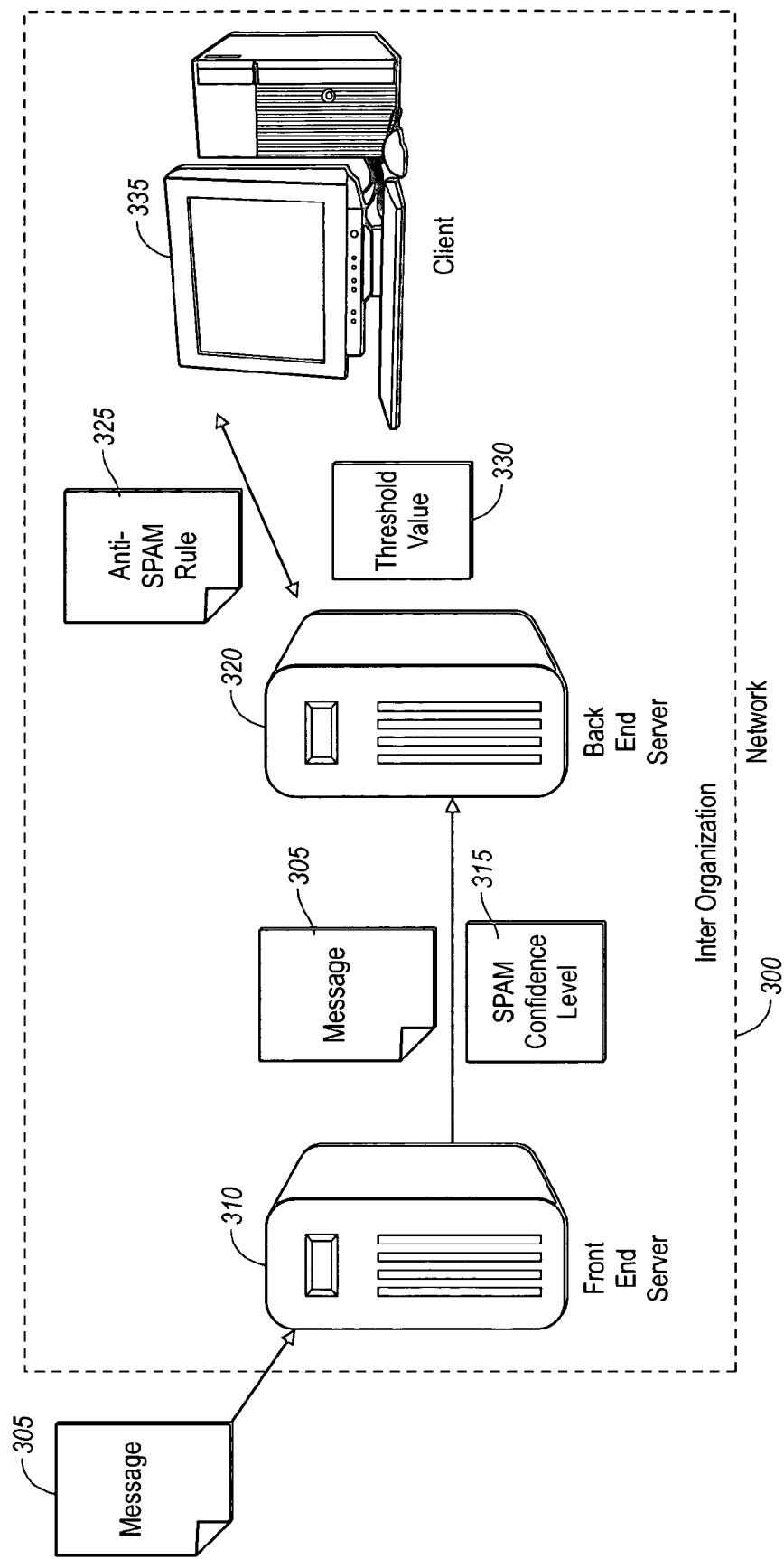
FIG. 3 illustrates the decoupling of a SPAM confidence level from actions and the flexibility in allowing a user to choose those actions in accordance with example embodiments.

As previously mentioned, typical messaging systems tie a SPAM confidence level to an Anti-SPAM rule and provide no flexibility in allowing a user to choose the actions to take if it is determined that a message is SPAM. Accordingly, other exemplary embodiments provide for an Anti-SPAM rule that is decoupled from the SPAM confidence level and the flexibility for a user to determine the actions to be performed on SPAM messages. For example, as shown in FIG. 3, embodiments provide for a network 300 that includes a front end server 310 and a back end server 320. When a message 305 is received by the front end server 310 (i.e., a server that can distribute mail to several mailboxes or back end servers), message 305 may be scanned by a calculation module (not shown) for various conditions such as various words, addresses, terms or phrases, etc. Based on, e.g., a weighted average of aggregate conditions meet, the calculation module assigns a SPAM confidence level 315 such as a specific value or percentage of likelihood that message is unsolicited or unwanted.

Message 305 and the corresponding SPAM confidence level 315 (which may be part of message 305) is sent and received by the user's mailbox server 320 (otherwise referred to herein as the back end server 320). Upon receipt of message 305 and SPAM confidence level 315 by back end server 320, the user defined Anti-SPAM rule 325 (received from client 335) can be loaded and executed. For instance, the SPAM confidence level 315 (which may be defined as a condition within the Anti-SPAM rule 325) can be compared using a rule execution module (not shown) to a threshold value 330 (either set by the user or defined as a default value). If the SPAM confidence level 315 exceeds the threshold value 330, various actions may be taken by the mailbox server (e.g., server 320) in accordance with the user's desires. For example, if message 305 is assigned a SPAM confidence level 315 of 75% by the front end server 310, and the user sets threshold value 330 at 70%, then message 305 can be sent to a junk folder, deleted, forwarded to another (e.g., system administrator) or any other user specified action. Accordingly, the present invention not only decouples the assignment of the confidence level 315 from the Anti-SPAM rule 325, but also provides the flexibility of allowing a user to set the various actions for the Anti-SPAM rule 325.

It should be noted that there are many variations associated with the above decoupling feature. For example, the comparison performed by the rule execution module does not necessarily need to be performed. Accordingly, even though the SPAM confidence level 315 is assigned using the calculation module, no action need to be taken by the rule execution module in regards thereto. Also, the comparison of the threshold value 330 to the SPAM confidence level 315 can be complex in nature, i.e., different threshold values 330 may be used for different scenarios. For instance, the comparison may be as follows: (1) if SPAM confidence level 315 is greater than 95%; or (2) if SPAM confidence level 315 is greater than 85% and not in white list; or (3) if SPAM confidence level 315 is less than 75% and sender on blacklist; then execute actions. Further, it should be noted that the Anti-SPAM rule 325 need not be an extended rule 230, as previously described. Moreover, it should be noted that the calculation module and the rule execution module may reside on a single machine. That is, the front end server 310, the back end server 320, and potentially even the client 335 may all be one unit. In addition, the Anti-SPAM rule 325 may or may not include the threshold value 330. If it does not, other embodiments allow for comparing the spam confidence level 315 to the threshold value 330 in order to determine if the Anti-SPAM rule 325 should even be loaded in order to conserver system resources. Of course, as one would recognize, there are many other variations that can be combined within the present Anti-SPAM rule 325 as illustrated and described in regards to FIG. 3. Accordingly, the illustration of the Anti-SPAM rule 325 and the description thereof in regards to FIG. 3 (as well as subsequent described embodiments thereof) are used for illustrative purposes only and are not meant to limit or otherwise narrow the scope of the present invention, except where explicitly claimed.

The above example embodiment of an Anti-SPAM rule 325 could be implemented as described above wherein actions are taken if the SPAM confidence level 315 is above a set threshold value 330. Other example embodiments, however, provide for exclusion conditions to the SPAM confidence level 315. For example, whitelists and blacklists may be created within the Anti-SPAM rule, wherein certain addresses either override or invoke the actions within the Anti-SPAM rule 325. For example, certain e-mail addresses or domain names (e.g., joe@company.com or @anothercompany.com, respectively) may be included in a whitelist within the Anti-SPAM rule 325 such that even if SPAM confidence level 315 is greater than the set threshold value 330, the message is sent to the user's inbox, rather than executing the actions defined within the Anti-SPAM rule 325. Alternatively, a user defined e-mail address or domain listed in a blacklist within the Anti-SPAM rule 325 could invoke the Anti-SPAM rule 325 actions even if the SPAM confidence level 315 is less than the threshold value 330.

It is noted that although the exceptions to the SPAM confidence level 315 have been described as conditions within the Anti-SPAM rule 325, the whitelist and blacklist could also be separate rules, which may prevent the Anti-SPAM rule 325 from being loaded and executed in order to save system resources. It is further noted that although the exceptions to the SPAM confidence level 315 have been described as whitelist and blacklists, the present invention is not limited to these exceptions. For instance, other example embodiments provide that messages sent within inter-organization 300 or from an otherwise authenticated source may be specially marked (using e.g. a SPAM confidence level 315 of negative one) in order to prevent the Anti-SPAM rule 325 from being loaded and executed. Example embodiments, however, provide that other extended rules need not be so marked. This marking feature, however, should also be able to be overridden by an administrator to force extended rules 230 to be loaded and executed regardless of the authenticity of the sender. Example embodiments provide, however, that a default of always load or do not always load extended rules 230 is also provided. Messages arriving from an authenticated source and missing a SPAM confidence level 315 can be assigned a SPAM confidence level 315 of negative one. On the other hand, as described in greater detail below, messages arriving at a server from an unauthenticated source may have any SPAM confidence level 315 associated with the message removed.

Further example embodiments provide for default settings for the threshold value 330 when it is determined that a user has improperly set the threshold value 330. For instance, if a user sets threshold value 330 as a negative value (e.g., −1, or some other invalid value) the Anti-SPAM rule would have the threshold value 330 replaced by a default value set by a system administrator. In other words, a user has created an Anti-SPAM rule 325 that essentially says if the message's SPAM confidence level 315 is above the administrator-established threshold, the message is junk and the appropriate actions should be performed on the message. It is noted that although the above default value for improper settings by a user is described using the threshold value 330, other improper settings to extended 230 or legacy 105 rules can also invoke a default value to be used. Accordingly, the use of the threshold value 330 as being set a default value based on an improper setting by a user is used for illustrative purposes only and is not meant to limit or otherwise narrow the scope of the claims unless otherwise explicitly claimed.

Other example embodiments provide extensions to the SPAM confidence level rule to prevent hackers from preventively setting the SPAM confidence level to zero. Nevertheless, front end servers, e.g., server 310, should still be allowed to set SPAM confidence levels 315 on messages 305 and let these values be relayed within inter-organization 300. For instance, example embodiments provide that unauthenticated traffic, e.g., messages from outside the inter-organization 300 received over the Internet, may have any SPAM confidence level 315 associated therewith stripped or removed from an incoming message. The SPAM confidence level 315 should be stripped from the incoming e-mail at the first point where the server that sent the e-mail is identified as unauthenticated in order to prevent hackers from simply using an inter-organization server 310, 320 to send out SPAM. Further embodiments provide that a SPAM confidence level 315 encoded in a body of a message may also be stripped. Of course, servers within an organization 310, 320 can be authenticated servers.

The present invention may also be described in terms of methods comprising functional steps and/or nonfunctional acts. The following is a description of steps and acts that may be performed in practicing the present invention. Usually, functional steps describe the invention in terms of results that are accomplished, whereas nonfunctional acts describe more specific actions for achieving a particular result. Although the functional steps and nonfunctional acts may be described or claimed in a particular order, the present invention is not necessarily limited to any particular ordering or combination of acts/or steps.

FIGS. 4A-B, 6A-B, and 7A-B illustrate various acts of and steps for in accordance with example embodiments of the present invention. The following description of these Figures will occasionally refer to corresponding elements from FIGS. 1-3. Although reference may occasionally be made to a specific element in FIGS. 1-3, the elements mentioned are used for illustrative purposes only and are not meant to limit or otherwise narrow the scope of the present invention unless otherwise specifically claimed.

FIG. 4A illustrates an example method 400 of extending a rule architecture to allow a client to stream and store message rule data to a server. The messaging system of method 400 otherwise communicates message rules to a client through a table interface to exchange message rules as rows in a rule table. Architectural limitations of the messaging system prevent rules larger than a specified size from being transferred between the client and the server.

Method 400 includes an act of creating 405 a message object. For instance, client 220 may be given instructions on how to create a message object. The message object created includes an extended rule 230 sufficiently large in size such that the extended rule 230 cannot be transferred in a single data packet. The extended rule 230 may define actions to take upon a list of acceptable or unacceptable e-mail address or domain names. Further, the extended rule 230 may include Unicode strings for avoiding any language conversion of the extended rule 230 by servers 225.

Method 400 further includes an act of setting 410 a property on the message object. For example, client 220 may also be given instructions on how to set a property on the message object for use in identifying the message object as including an extended rule. The property may be a message class property specifically identifying the message object as including an extended rule 230. After construction of the extended rule, method 400 also includes an act of streaming 415 a first packet and an act of streaming 420 a second packet. For instance, client 220 may stream first and second data packets 245, 246 to the server 225. The first and second packets 245, 246 including different portions of the message object, which are streamed to the server for storage and subsequent execution of the extended rule 230. Of course, as previously mentioned, there may be many subsequent packets streamed other than just the first and second packets 245, 246. Alternatively, there may only be a single packet streamed, i.e., the current extended rule architecture can be used to stream and store legacy 105 or other rules.

Other example embodiments provide for receiving legacy rules 105 through a table interface 115 as rows 140 in a rule table 130. The individual size of the legacy rules 105 being limited to be no bigger than can be transferred in a single data packet. In fact, some legacy systems 100 limit the aggregate size of the legacy rules 105 to be no larger than 32 kilobytes bytes. Next, properties within the legacy rules 105 can be modified, whereupon the modified legacy rules 105 are sent in a single data packet back to the server.

Still other example embodiments provide that an error may be received if the number of extended rules 230 exceeds a predefined amount. Alternatively, or in conjunction, an error may be received if the size of a condition structure within the extended rule 230 exceeds a predefined amount.

FIG. 4B illustrates an example method of extending rule architecture within a messaging system by implementing rules that were streamed to a server by a client. Method 450 includes an act of receiving 455 first and second streamed packets. For example, server 225 may receive first and second streamed packets 245, 246 from client 220. The method 450 further includes the act of storing 460 packets as a message object. For instance, upon receipt of the first and second packets 245, 246, server 225 may store the packets 245, 246 in message store 210 as a message object that includes extended rule 230. The extended rule 230 sufficiently large in size that it cannot be transferred in a single data packet. Further, the extended rule 230 may define actions to take upon a whitelist or blacklist of e-mail addresses or domain names. Moreover, the extended rule 230 may include Unicode strings for avoiding any language conversion of the extended rule 230 by the server.

Method 450 also includes a functional result-oriented step for executing 465 the message rule. For example, server 225 may execute extended rule 230 on messages 235 it receives. Step 465 includes a corresponding act of determining 470 the message object includes the extended rule. For example, based on a property value on the message object set by the client 220, server 225 may identify the message object as including the extended rule. The property set may be a specific message class property that identifies the message object as including extended rule 230. Step 465 also includes a corresponding act of subsequently applying 475 conditions and actions. For example, server 225 may apply the conditions and actions within the extended rule are applied to the message 235.

Other example embodiments provide for retrieving legacy rules 105 that are limited to be no larger than can be transferred in a single data packet. Other embodiments limit the aggregate size of the legacy rules 105 to be no larger than 32 kilobytes. Once the legacy rules 105 are retrieved, the extended rules 230 and the legacy rules can be loaded in memory to create a combined indistinguishable rule set. The combined indistinguishable rule set can then be applied to messages received by the server 225.

Still other example embodiments provided that if the conditions or actions defined by either the legacy rules 105 or the extended rules 230 include invalid entry data set by a user, the invalid entry data is replaced by a default value. Other example embodiments provide that the number of extended rules 230 is limited by a predefined amount. Further embodiments provide that the size of a condition structure within the extended message rule 230 is limited by a predefined amount.

Yet other example embodiments provide that it may be determined that actions within the legacy rules 105, the extended rules 230, or both, cannot be executed at the server 225. Accordingly, the client 220 is sent the appropriate rule for evaluation and execution on the message 235. The actions that cannot be executed at the server 225 may be an action to move a message 235 to a particular store that is not controlled by the server 225. As such, the store may be controlled by a client 220.

FIG. 6A illustrates an example method of decoupling a module that executes message rule actions from a module that assigns a SPAM confidence level by assigning a SPAM confidence level to a message at a front end server, while carrying out a user defined Anti-SPAM rule at a back end server. Method 600 includes the act of receiving 605 a message. For example, back end server 320 may receive message 305 from front end server 310. Further, method 600 may include the act of receiving 610 a SPAM confidence level. For instance, back end server 320 may receive SPAM confidence level 315 from front end server 310 indicating the likelihood that the received message 305 includes unsolicited or unwanted data. Other embodiments provide that the message 305 may be received at the front end server 310 from an unauthenticated server with a confidence level already embedded in the message. In such instances, embodiments allow for the confidence level to be removed before assigning SPAM confidence level 315.

Method 600 also includes an act of loading 615 an Anti-SPAM rule. For example, back end server 320 may load Anti-SPAM rule 325, which includes actions defined by a user that specify how to process the message when the SPAM confidence level 315 exceeds a threshold value 330. Example embodiments further provide that the threshold value 330 may be defined by the user as a condition in the Anti-SPAM rule 325.

Method 600 also includes an act of retrieving 620 a threshold value. For example, back end server 320 may retrieve threshold value 330. The threshold value 330 may be a default value or otherwise predetermined value. Alternatively, as described above, the threshold value 330 may be defined by the user. Other example embodiments provide that if the threshold value 330 is an invalid entry defined by the user, a default value is set for the threshold value. For instance, the threshold value 330 may be defined as a negative number by the user, in which case a default value will be used instead.

Method 600 further includes an act of comparing 625 SPAM confidence level with the threshold value. For instance, server 320 may compare SPAM confidence level 315 with threshold value 330. Based on the comparison, method 600 also includes the act of determining 630 if actions within the Anti-SPAM rule should be executed. For example, if SPAM confidence level 315 is above the threshold value 330, server 320 may execute the Anti-SPAM rule 330 actions on the message 305 received.

Example embodiments allow the user to set the action properties, which could be any of a move of the message to a specified folder, sending the message to another user (e.g., system administrator), tagging the message as SPAM, adding an email address or domain name associated with the message to a blacklist, deleting the message, copying the message, forwarding the message, replying to the message, modifying the message, or any other similar action. Other embodiments also allow a user to create conditions for the Anti-SPAM rule 325. For example the threshold value 330 may be a condition of the Anti-SPAM rule 325. Another condition may be a list of email address, domain names, or both, which provide exceptions to the SPAM confidence level 315 such that if the message 305 is received from a source in the list then the action properties are not executed regardless of the value of the SPAM confidence level 315. Yet another one of the conditions is another list of email addresses, domain names, or both, which provide exceptions to the SPAM confidence level 315 such that if the message 305 is received from a source in the list, the action properties are executed regardless of the value of the SPAM confidence level 315. These exceptions may be overridden by a system administrator.

Further embodiments allow a user to mark the Anti-SPAM rule 325 such that a message 305 determined to have been sent from within an organization 300 associated with the user prevents the Anti-SPAM rule 325 from being loaded into memory for execution. Other embodiments, however, allow for an override feature to the prevention of the Anti-SPAM rule 325 from being loaded into memory. Still other embodiments provide that if a message 305 is received from an unauthenticated server at the front end server 310 with a confidence level associated therewith, the confidence level is removed before assigning the SPAM confidence level 315.

FIG. 6B illustrates a method 640 of decoupling a module that assigns the SPAM confidence level from a module that executes the actions to be performed on a message by allowing a user to define action properties. Method 640 includes an act of allowing 645 a user to set a threshold value. For example, client 335 may provide user interface to allow the user to set threshold value 330. The threshold value 330 to be compared against a SPAM confidence level 315 to determine when action properties of an Anti-SPAM rule 325 should be implemented. The SPAM confidence level 315 generated in response to receiving a message 305 and defining how to rate the message 305 as including unsolicited or unwanted data.

Method 640 further includes an act of allowing 650 the user to create action properties. For example, client 335 may provide the user interface to allow the user to create action properties associated with Anti-SPAM rule 325. The action properties defining how to process a message 305 when the SPAM confidence level 315 exceeds the threshold value 330. Further, method 640 includes an act of creating 655 the Anti-SPAM rule. For example, client 335 can create Anti-SPAM rule 325 configured to implement the action properties defined by the user when the SPAM confidence level 315 exceeds the threshold value 330. Moreover, method 640 includes an act of sending 660 Anti-SPAM rule and threshold value to a server. For example, client 335 may send the threshold value 330 and the Anti-SPAM rule 325 to back end server 320 for storage and subsequent implementation.

Figure 7B:
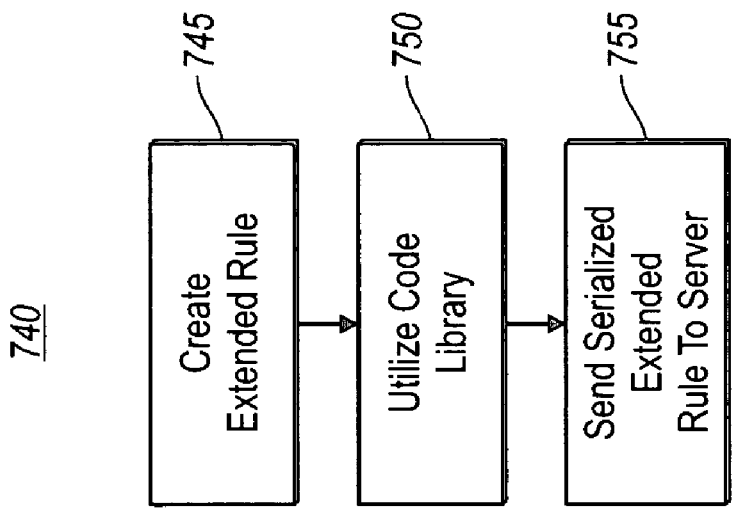
FIG. 7B illustrates an example flow chart of a method of storing a message rule in a global form understandable by both the server and the client for ease in transferring the rule between servers in accordance with exemplary embodiments.
Figure 7A:
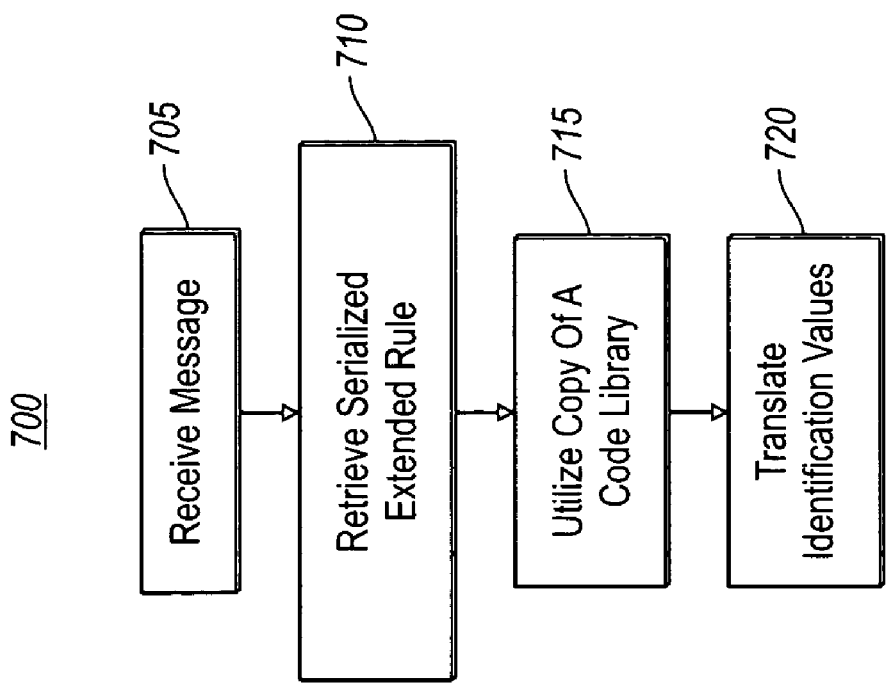
FIG. 7A illustrates an example flow chart of a method of translating a messages rule from a global form into a server specific form during execution of the message rule in accordance with exemplary embodiments.

FIG. 7A illustrates a method 700 of translating message rules from a global form into a server specific form during execution of the message rule. Method 700 includes an act of receiving 705 a message. For example, server 225 may receive message 235. Further, method 700 includes an act of retrieving 710 a serialized extended rule. For example, in response to receiving message 235, server 225 may retrieve from server store 210 a serialized extended rule 230 that was serialized by client 220 using code library 240.

Moreover, method 700 includes the act of utilizing 715 a copy of a code library. For instance, server 225 may utilize a copy of code library 240 to deserialize the extended rule 230. The extended rule 230 including condition and action structures, the action structures including identification values. The identification values being in a global form such that they can be compatibly transferred between computer systems that have differing server specific forms. Other embodiments limit the size of the condition structures by a predefined amount, which may be set by a system administrator.

Method 700 further includes an act of translating 720 identification values. For example, server 225 may translate identification values associated with the actions within extended rule 230 into a server specific form for use in applying the action structures to the received message 235. Other example embodiments provide for receiving legacy rules 105 from server store 210, which include action structures with identification values that are stored in server specific form. The legacy rules 105 and the extended rules 230 may then be loaded into memory for execution on received message 235. The aggregate size of the legacy rules 230 may be limited to be no larger than 32 kilobytes. Further, the extended rules 230 may include Unicode strings for avoiding any language conversion of the extended message rules by the server 225.

Other example embodiments provide that the serialized extended rule 230 is received at server 225 from another server prior to retrieval from the server storage. In other words, because the extended rules 230 are stored in a global form, they can be easily transferred between servers.

FIG. 7B illustrates a method 740 of storing message rules in a global form understandable by both a server and a client for ease in transferring the message rules between servers. Method 740 includes an act of creating 745 an extended rule. For example, client 220 may create extended rule 230 that includes condition and action structures, at least the action structures including identification values. The identification values being in a global form such that they can be compatibly transferred between computer systems that have differing server specific forms.

Method 740 also includes an act of utilizing 750 code library. For example, client 220 may utilize code library 240 to serialize the extended rule 230 for transportation to server 225. The server 225 will translate the identification values into server specific form during execution of the extended rule 230. Method 740 further includes an act of sending 755 serialized extended rule to a server. For instance, client 220 may send the serialized extended rule 230 to server 225 for storage in the serialized form. Server 225 may subsequently utilize a copy of code library 240 to deserialize the extended rule 230 during execution.

Other example embodiments provide for receiving legacy rules 105 from server 225 as rows 140 within a rules table 130. The legacy rules having condition and action structures, the action structures including identification values that are translated from the server specific form into the global form. The legacy rules may then be modified by client 220 and sent back to the server in the global form. The modified legacy rules 105 are then translated and stored at the server store 230 in the server specific form.

Still other example embodiments provide for receiving extended rules 230 that include condition and action structures, the action structures including identification values associated therewith. The identification values being in global form such that they can be compatibly transferred between computer systems that have differing server specific forms. The extended rules 230 are then modified and serialized utilizing the code library 240 for transportation back to the server 225. The server 225 can subsequently translate the identification values into server specific form upon execution of the extended rules 230. Client 220 then sends the serialized extended rules to server 225 for storage in the serialized form. The server 225 subsequently utilizes a copy of code library 240 to deserialize the extended rules 230 during execution.

Further example embodiments provide that an error may be returned to the client 220 if the size of the condition structures with the extended rules 230 exceeds a predefined amount. Further, an error may be returned to the client 220 if the number of extended rules 230 exceeds a predefined amount. Other example embodiments do not load any additional extended rule 230 beyond the predefined amount, without returning an error to the client.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. Optical disc drive 530 is one example of an optical media recorder. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A principal may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549*a* and 549*b*. Remote computers 549*a* and 549*b* may each be another personal computer, a server, a router, a network. PC, a peer device or other common network node, and typically include many or all of the elements described above relative to the computer 520, although only memory storage devices 550*a* and 550*b* and their associated application programs 536*a* and 536*b* have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

Accordingly, the present invention may be practiced in a computer that is connected to an optical media recorder over a computer network. In some new systems, system bus 523 is encapsulated and sent across a new transport, such as a TCP/

IP network. For example, ISCSI (Internet SCSI or Internet Small Computer Systems Interface) is one fairly well-known implementation of a TCP/IP-based protocol for establishing and managing connections between IP-based storage devices, hosts, and principals.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of streaming message processing rules from a client to a server, the method comprising acts of:
   sending a Remote Procedure Call (RPC) to the server, when a size of a message processing rule is less than a size limit, a buffer of the RPC containing a message processing rule as a row in a rule table, the size limit being a maximum size of data that can be transferred in a RPC; and
   when the size of the message processing rule is greater than the size limit:
      creating, by the client, a message object that includes the message processing rule and a class property separate from the message processing rule, the class property identifying the message object as including an extended message processing rule, wherein the server loads message processing rules from message objects depending on whether class properties of the message objects identify the message objects as including extended message processing rules;
      streaming, by the client, a first RPC including a portion of the message object to the server for storage and subsequent execution of the message processing rule; and
      streaming, by the client, a second RPC including a different portion of the message object to the server for storage and subsequent execution of the message processing rule.

2. The method of claim 1, further comprising acts of:
   receiving one or more legacy message processing rules through a table interface as rows in the rule table, at least the individual size of the one or more legacy message processing rules being limited to be no bigger than can be transferred in a single RPC;
   modifying one or more properties within the one or more legacy message processing rules; and
   sending the one or more modified legacy message processing rules in a single data packet back to the server.

3. The method of claim 2, wherein an aggregate size of the one or more legacy message processing rules is limited by architectural limitations of a messaging system to be no larger than 32 kilobytes.

4. The method of claim 1, wherein an error is received if the number of extended message processing rules applied by the server exceeds a predefined amount.

5. The method of claim 1, wherein an error is received if the size of a condition structure within the message processing rule exceeds a predefined amount.

6. The method of claim 1, wherein the message processing rule defines actions to take upon a list of acceptable or unacceptable e-mail addresses or domain names.

7. The method of claim 1, wherein the message processing rule includes Unicode strings for avoiding any language conversion of the message processing rule by the server.

8. In a messaging system including a server that otherwise communicates to a client through a table interface to exchange message processing rules as rows in a rule table, architectural limitations of the messaging system preventing message processing rules larger than a specified size from being transferred, a method of streaming message processing rules to the server by the client, the method comprising acts of:
   receiving, by the server, a first remote procedure call (RPC) streamed from the client and a second RPC streamed from the client;
   storing the first RPC and the second RPC as a message object at the server, the message object including an extended message processing rule and a class property separate from the extended message processing rule, the extended message processing rule being a message processing rule sufficiently large in size that the extended message processing rule cannot be transferred in a buffer of a single RPC, the class property indicating whether the message object includes an extended message processing rule;
   based on the class property in the message object, determining, by the server, whether the message object includes the extended message processing rule; and
   after determining that the message object includes the extended message processing rule, applying, by the server, conditions and actions indicated by the extended message processing rule to a message received at the server.

9. The method of claim 8, further comprising acts of:
   retrieving one or more legacy message processing rules, at least the individual size of the one or more legacy message processing rules being limited to be no larger than can be transferred in a single RPC;
   loading the one or more legacy message processing rules and the extended message processing rule in memory that creates a combined indistinguishable rule set; and
   applying the combined indistinguishable rule set to one or more received messages.

10. The method of claim 9, wherein the aggregate size of the one or more legacy message processing rules is limited by the architectural limitations of the messaging system to be no larger than 32 kilobytes.

11. The method of claim 9, wherein if one or more conditions or actions defined by either the one or more legacy message processing rules or the extended message processing rule include invalid entry data set by a user, and wherein the invalid entry data is replaced by a default value.

12. The method of claim 9, further comprising the acts of:
determining that one or more actions within the one or more legacy message processing rules, the extended message processing rule, or both, cannot be executed at the server; and
based upon the determination, sending an appropriate message processing rule to the client for evaluation and execution.

13. The method of claim 12, wherein the one or more actions that cannot be executed at the server is to move or copy a message to a particular store that is not controlled by the server.

14. The method of claim 13, wherein the store is controlled by the client.

15. The method of claim 8, wherein the number of extended message processing rules applied by the server is limited by a predefined amount.

16. The method of claim 8, wherein a size of a condition structure within the extended message processing rule is limited by a predefined amount.

17. The method of claim 8, wherein the extended message processing rule defines actions to take upon a whitelist or blacklist of e-mail addresses or domain names.

18. The method of claim 8, wherein the extended message processing rule includes Unicode strings for avoiding any language conversion of the extended message processing rule by the server.

19. In a messaging system including a server that otherwise communicates to a client through a table interface to exchange message processing rules as rows in a rule table, architectural limitations of the messaging system preventing message processing rules larger than a specified size from being transferred, a method of streaming message processing rules to the server by the client, the method comprising:
receiving, by the server, a first Remote Procedure Call (RPC) streamed from the client and a second RPC streamed from the client;
storing the first RPC and the second RPC as a message object at the server, the message object including an extended message processing rule and a class property separate from the extended message processing rule, the extended message processing rule being a message processing rule sufficiently large in size that the extended message processing rule cannot be transferred in a buffer of a single RPC, the class property indicating whether the message object includes an extended message processing rule;
based on the class property on the message object, determining, by the server, whether the message object includes the extended message processing rule; and
after determining that the message object includes the extended message processing rule, executing the extended message processing rule on a received message.

20. The method of claim 19, further comprising acts of:
retrieving one or more legacy message processing rules, at least the individual size of the one or more legacy message processing rules being limited to be no bigger than can be transferred in a buffer of a single RPC;
loading the one or more legacy message processing rules and the extended message processing rule in memory that creates a combined indistinguishable rule set; and
applying the combined indistinguishable rule set to one or more received messages.

21. A computer program product for implementing a method of streaming message processing rules from a client to a server, the computer program product comprising one or more computer readable media, wherein the one or more computer readable media do not consist of a propagated data signal, the one or more computer readable media having stored thereon computer executable instructions that, when executed by a processor, cause the client to perform the following:
when a size of a message processing rule is less than a size limit, sending a Remote Procedure Call (RPC) to the server, a buffer of the RPC containing a message processing rule as a row in a rule table, the size limit being a maximum size of data that can be transferred in a RPC; and
when the size of the message processing rule is greater than the size limit:
create a message object that includes the message processing rule and a class property separate from the message processing rule, the class property identifying the message object as including an extended message processing rule, wherein the server loads message processing rules from message objects depending on whether class properties of the message objects identify the message objects as including extended message processing rules;
stream a first RPC including a portion of the message object to the server for storage and subsequent execution of the message processing rule; and
stream a second RPC including a second different portion of the message object to the server for storage and subsequent execution of the message processing rule.

22. The computer program product of claim 21, further comprising computer executable instructions that cause the client to perform the following:
receive one or more legacy message processing rules through a table interface as rows in the rule table, at least the individual size of the one or more legacy message processing rules being limited to be no larger than can be transferred in a buffer of a single RPC;
modify one or more properties within the one or more legacy message processing rules; and
send the one or more modified legacy message processing rules in a single RPC back to the server.

23. The computer program product of claim 22, wherein the aggregate size of the one or more legacy message processing rules is limited by architectural limitations of a messaging system to be no larger than 32 kilobytes.

24. The computer program product of claim 21, wherein an error is received if the size of a condition structure within the message processing rule exceeds a predefined amount.

25. The computer program product of claim 21, wherein the message processing rule defines actions to take upon a list of acceptable or unacceptable e-mail addresses or domain names.

26. The computer program product of claim 21, wherein the message processing rule includes Unicode strings for avoiding any language conversion of the message processing rule by the server.

27. In a messaging system including a server that otherwise communicates to a client through a table interface to exchange message processing rules as rows in a rule table, architectural limitations of the messaging system preventing message processing rules larger than a specified size from being transferred, a computer program product for implementing a method of streaming message processing rules to the server by the client, the computer program product comprising one or more computer readable media, wherein the one or more computer readable media do not consist of a propagated data signal, the one or more computer readable media having stored thereon computer executable instructions that, when executed by a processor, cause the server to perform the following:

receive a first remote procedure call (RPC) streamed from the client and a second RPC streamed from the client;

store the first RPC and the second RPC as a message object at the server, the message object including an extended message processing rule and a class property separate from the extended message processing rule, the extended message processing rule being a message processing rule sufficiently large in size that the extended message processing rule cannot be transferred in a buffer of a single RPC, the class property indicating whether the message object includes an extended message processing rule;

based on the class property in the message object, determine whether the message object includes an extended message processing rule; and after determining that the message object includes the extended message processing rule, apply conditions and actions within the extended message processing rule to a message received at the server.

28. The computer program product of claim 27, further comprising computer executable instructions that cause the server to perform the following:

retrieve one or more legacy message processing rules, at least the individual size of the one or more legacy message processing rules being limited to be no bigger than can be transferred in a buffer of a single RPC;

load the one or more legacy message processing rules and the extended message processing rule in memory that creates a combined indistinguishable rule set; and apply the combined indistinguishable rule set to one or more received messages.

29. The computer program product of claim 28, wherein the aggregate size of the one or more legacy message processing rules is limited by the architectural limitations of the messaging system to be no larger than 32 kilobytes.

30. The computer program product of claim 28, wherein if one or more conditions or actions defined by either the one or more legacy message processing rules or the extended message processing rule include invalid entry data set by a user, the invalid entry data is replaced by a default value.

31. The computer program product of claim 28, further comprising computer executable instructions that cause the server to perform the following:

determine that one or more actions within the one or more legacy message processing rules, the extended message processing rule, or both, cannot be executed at the server; and based upon the determination, send an appropriate rule to the client for evaluation and execution.

32. The computer program product of claim 31, wherein the one or more actions that cannot be executed at the server is to move or copy a message to a particular store that is not controlled by the server.

33. The computer program product of claim 32, wherein the store is controlled by the client.

34. The computer program product of claim 27, wherein a size of a condition structure within the extended message processing rule is limited by a predefined amount.

35. The computer program product of claim 27, wherein the extended message processing rule includes Unicode strings for avoiding any language conversion of the extended message processing rule by the server.

36. The computer program product of claim 27, wherein the extended message processing rule defines actions to take upon a list of acceptable, unacceptable, or both, e-mail addresses or domain names.

* * * * *